United States Patent [19]

Stricker

[11] Patent Number: 4,479,744
[45] Date of Patent: Oct. 30, 1984

[54] CUTTING TOOL

[75] Inventor: Rudolf Stricker, Lermoos, Austria

[73] Assignee: Schwarzkopf Development Corporation, New York, N.Y.

[21] Appl. No.: 413,983

[22] Filed: Sep. 2, 1982

[30] Foreign Application Priority Data

Sep. 9, 1981 [AT] Austria ................................. 3888/81

[51] Int. Cl.³ ........................ B23P 15/28; B26D 1/00; B26D 3/00
[52] U.S. Cl. ................................................. 407/114
[58] Field of Search ........................ 407/114, 115, 116

[56] References Cited

U.S. PATENT DOCUMENTS

| 3,973,308 | 8/1976 | Lundgren | 407/116 |
| 4,247,232 | 1/1981 | McCreery et al. | 407/114 |

FOREIGN PATENT DOCUMENTS

| 047904 | 4/1979 | Austria | 407/114 |
| 2515686 | 11/1975 | Fed. Rep. of Germany | |
| 2545769 | 4/1977 | Fed. Rep. of Germany | |
| 047704 | 4/1977 | Japan | 407/114 |

OTHER PUBLICATIONS

Horvath, *Machine Design*, vol. 47, No. 19, 1975, p. 30.

Primary Examiner—Leonidas Vlachos
Assistant Examiner—W. E. Terrell
Attorney, Agent, or Firm—Morgan, Finnegan, Pine, Foley & Lee

[57] ABSTRACT

A cutting tool having improved chip runoff over a wide range of cutting conditions is provided. The cutting tool improves chip deformation and reduces cutting forces, resulting in the generation of lower temperatures and increased service life. The tool has at least two notches near a cutting corner which are positioned at an angle with respect to a cutting edge. As notches are positioned farther from the cutting corner the angle increases and the notches are spread farther apart. The arrangement reduces cutting forces even for larger feeds. In addition, the notches are provided with two opposite sides which differ in vertical slope, the side farther from the corner having the greater slope to again facilitate chip deformation and reduce friction.

12 Claims, 3 Drawing Figures

U.S. Patent        Oct. 30, 1984        4,479,744
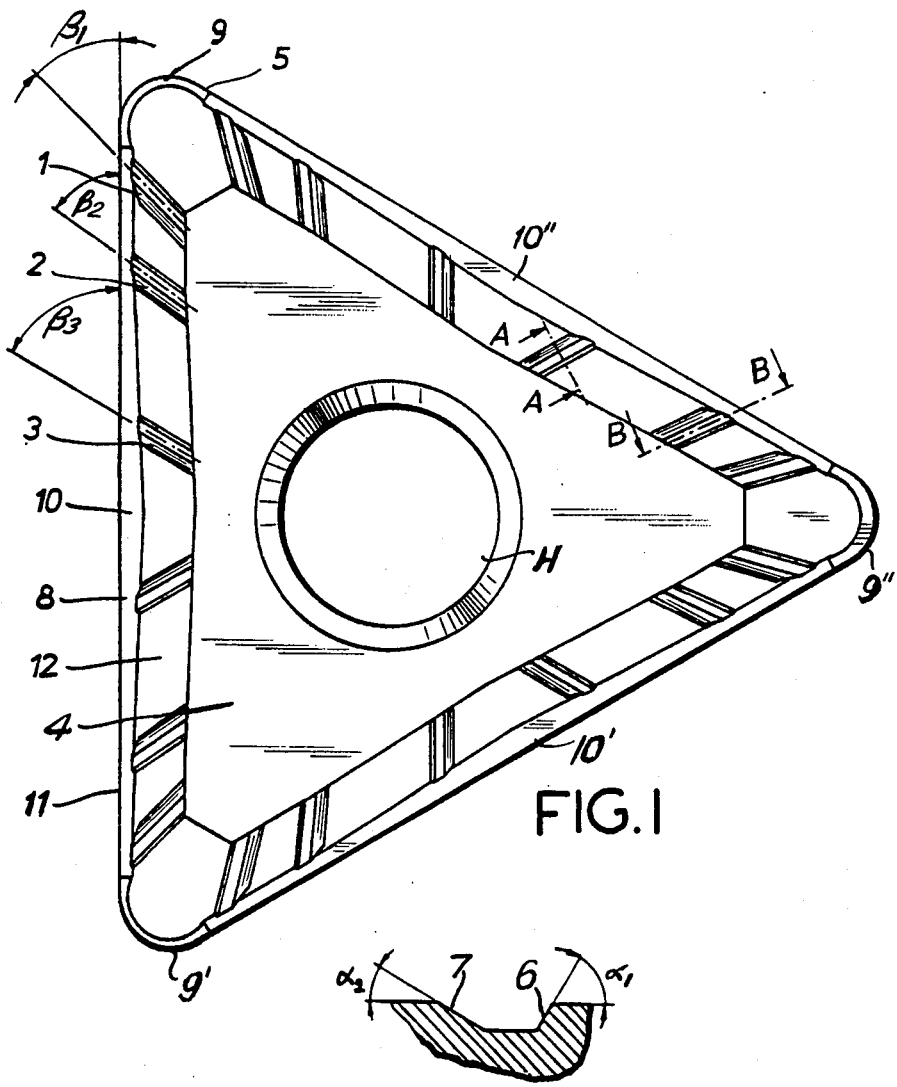
FIG.1
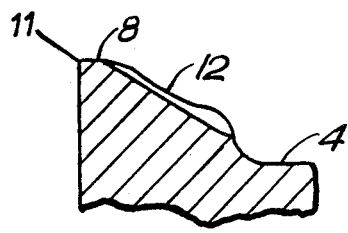
FIG.2
FIG.3

CUTTING TOOL

This invention relates to a cutting tool. More particularly, the invention relates to an adjustable cutting tool or indexable insert provided with a cutting edge, a cutting corner and a chip runoff area which joins the cutting edge, the chip runoff area being comprised of at least two hollows which deform a chip transversely to the direction of runoff and which begin near the respective cutting edge and lead into the middle region of the cutting tool.

BACKGROUND OF THE INVENTION

In cutting tools, indexable inserts for instance, chip runoff surfaces in the form of specially shaped chip-runoff areas serve in the main to ensure that in the chip-removing formation there is a good chip runoff without endangering operating personnel and without the chips causing destruction of the cutting edge. The essential requirements for chip-runoff areas are to produce as good a chip deformation and as good a chip break as possible over as wide a range of different cutting requirements as possible and, at the same time, to meet the requirement (in essence, the opposite requirement) that the cutting forces additionally appearing because of the chip deformation be kept limited, since higher cutting forces generally involve a rise in temperature of the cutting edge and result in a shortened service life.

In order that the mechanical strength of the cutting edge not be reduced too greatly by the chip-runoff areas, thereby making it necessary to accept a premature end to the service life of the cutting tool, because of cutting-edge breakages, a tried and proven way has long been to provide between the cutting edge and the chip-runoff areas a rotating bezel having a constant or a variable breadth, rather than to have the chip-runoff areas begin directly at the cutting edge.

West German Offenlegungsschrift No. 2,515,686 discloses a cutting tool in which the chip area is furnished with several indentations or grooves which are separated from each other and are disposed at a certain distance from the cutting edge. The grooves run preferably perpendicular to the cutting edge and reduce, according to the teaching set forth therein, the runoff chip's contact surface with the chip area, whereby the friction, and therefore the occurring temperature load on the cutting edge, is reduced. However, the grooves have no influence on chip deformation and chip break, so that this cutting tool exhibits only limited advantages in comparison with previously known designs.

In West German Offenlegungsschrift No. 2,545,769 there is disclosed an adjustable cutting tip of the kind mentioned hereinabove. However, the hollows are constructed preferably in the shape of a spherical segment or with a cross-section in the shape of a circular segment. At least one hollow is disposed preferably within the region of the transition from the major cutting edge to the minor cutting edge. A disadvantage of the construction disclosed is that the notches, viewed in the chip-runoff direction, have an ascending rear side and as the chips run off they are deformed excessively by the ascending rear side and an overbreak of the chips occurs, especially when large forward feeds are delivered to the cutting edges. Consequently, high cutting forces as well as an excessively great temperature development on the cutting edge results. Moreover, by locating at least one hollow in the transitional area between the major cutting edge and the minor cutting edge, a mechanical weakening of the cutting edge results, especially at the areas thereof which are subjected to the higher mechanical and thermal stresses. Therefore, this design does not fulfill adequately the requirements mentioned above for chip-conducting steps.

There exists, therefore, a need for a cutting tool which does not exhibit the mentioned disadvantages and it is an object of this invention to provide a cutting tool of the kind described at the outset, which exhibits an improved chip runoff in comparison with known designs over as large as possible a range of different cutting requirements, and, at the same time, in comparison with known designs of chip-runoff areas, a reduction of the cutting forces and cutting temperature with consequent increase in service life of the cutting edge being attained. The present invention fulfills such a need.

BRIEF STATEMENT OF THE INVENTION

In its broad aspects, there is provided, in accordance with the invention, a cutting tool having a cutting edge, a cutting corner and a chip runoff area adjoining the cutting edge, the chip runoff area being comprised of at least two hollows beginning near the cutting edge and leading into the middle region of the cutting tool and deforming a chip transversely to the direction of runoff, the hollows having the form of notches extending from the cutting edge into the middle region of the cutting tool without a rear limiting surface, the first of each of the notches being located in the chip runoff surface immediately outside the transitional region of the cutting edge and between the major and minor cutting surfaces thereof, the individual notches having increasingly larger spacings between one another towards the middle portion of the cutting edge, the individual notches and the cutting edge enclosing angles, $\beta$, which increase towards the middle portion of the cutting edge, the two sides of each of the notches having different angles of slope in relation to the horizontal, the angle of slope or inclination $\alpha_1$ of each side located nearer the cutting corner being greater than the angle of inclination or slope $\alpha_2$ of the other side.

In accordance with a preferred form of the invention, there is provided an adjustable cutting tool having a plurality of cutting corners, a plurality of chip runoff areas and a plurality of cutting edges, one each of the plurality of chip runoff areas adjoining one each of the cutting edges and being comprised of at least two hollows beginning near the respective cutting edges and leading into the middle region of the cutting tool and deforming a chip transversely to the direction of runoff, said hollows having the form of notches extending from said respective cutting edges into the middle region of said cutting tool without a rear limiting surface, the first of each of said notches being located in the chip runoff surface immediately outside the transitional region of each of the respective cutting edges and between the major and minor cutting surfaces thereof, the individual notches having increasingly larger spacings between one another towards the middle portion of each of said respective cutting edges when they are greater than two in number, said individual notches and their respective cutting edges enclosing angles, $\beta$, which increase towards the middle portion of each of said respective cutting edges, the two sides of each of said notches having different angles of slope in relation to the horizontal, the angle of slope or inclination $\alpha_1$ of each side located nearer said cutting corners being greater than the angle of inclination or slope $\alpha_2$ of the other side.

THE DRAWINGS

In order to describe the cutting tool, of this invention more fully, reference is directed to the accompanying drawings which are to be taken in conjunction with the following description and in which drawings:

FIG. 1 is a plan view of a triangular, adjustable cutting tool, according to the invention showing the chip runoff area provided with notches;

FIG. 2 is a partial, sectional view of a cutting tool according to the invention taken across lines A—A of FIG. 1 and illustrating the different angles of slope or inclination of the sides of a notch transverse to the longitudinal axis thereof; and FIG. 3 is a partial, sectional view of a cutting tool according to the invention taken across lines B—B of FIG. 1 and showing a longitudinal section through a notch.

DESCRIPTION OF THE PREFERRED EMBODIMENTS

Expressed in more particular detail, a cutting tool according to the invention is provided with hollows which are shaped as longitudinal notches, as seen from the cutting edge, which lead into the middle region of the cutting tool without a rear delimiting surface. A first notch is provided in the chip runoff area immediately outside the transitional region between a major cutting edge and a minor cutting edge. The individual notches towards the middle of a cutting edge have increasingly larger spacing between one another and with the cutting edge enclose angles, $\beta$, which increase towards the middle of the cutting edge when more than two hollows are utilized. Moreover, the two sides of each notch have different angles of slope, $\alpha$, in relation to the horizontal, the angle of slope or inclination of the side situated nearer a cutting corner being greater than the angle of inclination of the other side.

It has proved advantageous if a first notch provided in the chip area, as seen from the cutting point, has an angle in the range of 40° to 60° and preferably 45° to 50°, any notch or notches following such first notch enclosing an angle in the range of 50° to 90° with respect to a cutting edge.

Furthermore, in a preferred structure of the invention the side of each notch which is nearer a cutting corner has an angle of inclination in the range of 70° to 45° in relation to the horizontal, and the other side or opposite side of each notch has an angle of inclination in the range of 30° to 10°.

When the longitudinal notches are disposed and shaped according to the invention within these particular angular ranges, optimal chip deflection and optimal chip break are achieved over practically the entire spectrum of practically possible different cutting requirements even with different materials.

When a cutting tool is shaped according to the invention, the requirements set forth above in the previously mentioned statement of objective are in large measure fulfilled. Individually, the following advantages in comparison to known designs are achieved.

By shaping the hollows as longitudinal notches which, seen from the cutting edge, lead without a rear delimiting surface into the cutting tool's middle region, which is depressed in relation to the cutting edge, there is achieved to an unexpected extent a good chip deformation effect that is in a widely varying range independent of the cutting requirements. Moreover, when large forward feeds are delivered to the cutting edge, this special shaping has a particularly favorable effect, since the chip deformation takes place (in contrast to known cutting tools) only by way of the sides of the notches, the hollows being open at the rear. The result is a less strong chip compression which in turn involves lower cutting forces and a lower cutting temperature.

Due to the fact that the first notch is disposed in the region immediately outside the transitional region between a major cutting edge and a minor cutting edge, that is, outside the radius of curvature of a corner, and encloses with the cutting edge the smallest angle, $\beta$, of all of the notches, the result, especially in finish machining, is optimal chip deflection without the cutting corner being weakened mechanically. The latter advantage is especially important for avoidance of cutting-corner breaks in rough machining.

By locating the notches with respect to a cutting edge to form and enclose the angles, $\beta$, which increase towards the middle of the cutting edge and which with the cutting edge enclose the individual notches, and by locating the notches at increasing distances from one another, the chips, at greater cutting depths, are, in comparison with known designs, no longer so strongly deformed transversely to the forward-feed direction. This results in less chip compression and, therefore, less cutting forces and thermal stress on the cutting edge.

The varying inclination of the sides of the notches also, surprisingly, effects a marked improvement in chip runoff. The side that is nearer to a cutting corner has a greater angle of slope in relation to the horizontal and removes the departing chip in the desired direction away from the worked surface, while the other, more gently sloped side, assists the removal of the chip by reason of its comparatively low frictional resistance.

Turning now to FIG. 1, there is shown there a triangular adjustable cutting tool according to the invention, having a central hole H adapted to mount the tool on a suitable holder (not shown). The individual cutting edges 10, 10' and 10" have a bezel 8 which has narrowest width in the cutting corners 9, 9' and 9", and which increases in its width continuously from the cutting corners towards the end of the effective length of the cutting edges. Connected to bezel 8 is a chip-runoff area 12, which extends completely around all three sides of the tool and runs out into the middle region 4 of the adjustable cutting tip. Within each region of effective length of a cutting edge, three longitudinal notches 1, 2, 3 extend through chip-runoff area 12 and in a transverse direction with respect to the edge 11 of the cutting edge 10.

The individual notches begin at the transitional region of cutting-edge bezel 8 and chip-runoff area 12 and, at the end of the chip-runoff area 12, as seen from the edge 11 of cutting edge 10, they enter, without a rear delimiting surface, into the deeper situated central region 4 of the adjustable cutting tool. The first notch 1 is disposed immediately outside the radius of curvature of corner 9, that is, outside the transitional region 5 between a major cutting edge and a minor cutting edge, enclosing an angle, $\beta_1$, of 45° in relation to the edge 11 of cutting edge 10. The second notch 2 encloses an angle, $\beta_2$, of 55° in relation to the edge 11 of cutting edge 10, and the third notch 3 encloses an angle, $\beta_3$, of 60°. The spacing between the individual notches 1, 2, 3 in relation to one another increases in the direction of the end of the effective cutting edge length. Each individual notch 1, 2, 3, with the exception of the downward-sloped starting region, is delimited by a level, essentially rectangular base surface and by level, likewise essentially rectangular sides 6, 7 which have different angles of inclination, $\alpha_1$, and $\alpha_2$. The notches 1, 2, 3 have essentially constant depth and breadth.

As shown more specifically in FIG. 2 which is a section transverse to the longitudinal direction of notch 2, side 6 situated nearer cutting corner 9 has a larger angle of inclination, $\alpha_1$, of 60° than side 7, which has an angle of inclination, $\alpha_2$, of 30°.

Referring next to FIG. 3, which is a longitudinal section through notch 1, it is seen that the notch, outside of its downward sloped region at the beginning, has essentially constant depth and passes over, without a rear limiting surface, into the deep-situated middle region 4 of the adjustable cutting tool.

It is to be understood that the present invention is by no means restricted to the structure shown in the drawings. Thus, it is conceivable for the longitudinal notches according to the invention to be used also with cutting inserts without chip-conducting troughs. It is also conceivable for the longitudinal notches to be delimited not by level but by cam-shaped lateral surfaces. In addition, the breadth, depth and inclination of the longitudinal notch along the extent of its length can vary. In particular, in the case of heavy-duty cutting tools, or cutting tools for milling, it can be advantageous to dispose the longitudinal notches out beyond the middle of the cutting edge to the end of the cutting edge. The spacing of the notches in relation to one another, and the angles enclosed by the notches with the cutting edge, then increase away from the cutting corner to the end of the cutting edge.

It is to be understood that the descriptive embodiments of this invention set forth herein are illustrative only and the concepts of this invention are not to be limited thereby, except as defined in the appended claims.

What is claimed is:

1. A cutting tool having a cutting edge, a curved cutting corner; a chip runoff area adjoining said cutting edge and a middle region having a lower planar floor, said chip runoff area being comprised of at least two hollows beginning near said cutting edge and leading into a middle region of said cutting tool and adapted to deform a chip transversely to the direction of chip runoff, each of said hollows having the form of a notch extending along a longitudinal axis from said cutting edge into the middle region of said cutting tool and extending toward said lower planar floor of said middle region, the first of each of said notches being located in the chip runoff area immediately outside a curved transitional region of said curved corner and said cutting edge, said individual notches positioned farther from said curved cutting corner having increasingly larger spacings between one another, the longitudinal axis of each of said individual notches enclosing an angle ($\beta$) with respect to said cutting edge, said angle ($\beta$) increasing with respect to individual notches positioned farther from said curved cutting corner, each of said individual notches having two opposite sides of different vertical slope with respect to a horizontal plane, the side of each of said notches positioned nearer each curved cutting corner sloping at an angle ($\alpha_1$) with respect to said horizontal plane, the side of said notch positioned farther from said curved cutting corner sloping at an angle ($\alpha_2$) with respect to said horizontal plane, said ($\alpha_1$) being greater than ($\alpha_2$) for each individual notch.

2. A cutting tool according to claim 1 wherein said chip runoff area is comprised of two hollows.

3. A cutting tool according to claim 1 wherein said chip runoff area is comprised of three hollows.

4. A cutting tool according to claim 1 wherein the angle of slope or inclination ($\alpha_1$) is in a range of 45° to 70° and the angle of inclination or slope ($\alpha_2$) is in a range of 10° to 30°.

5. A cutting tool according to claim 1 wherein the chip runoff area is comprised of two hollows having the form of notches and the first of the notches nearest the cutting corner encloses an angle ($\beta$), which is in a range of 40° to 60° with respect to the adjoining edge.

6. A cutting tool according to claim 1 wherein the chip runoff area is comprised of three hollows having the form of notches, the first of the notches nearest said curved cutting corner enclosing an angle ($\beta_1$), which is in a range of 40° to 60° with respect to the adjoining cutting edge and the second and third of the notches enclosing angles ($\beta_2$) and ($\beta_3$), which are in a range of 50° to 90° with respect to the adjoining cutting edge.

7. An adjustable cutting tool having a plurality of curved cutting corners, a plurality of chip runoff areas, a plurality of cutting edges, and a middle region having a lower planar floor one each of said plurality of chip runoff areas adjoining one each of said cutting edges and being comprised of at least two hollows beginning near respective cutting edges and leading into said middle region of said cutting tool and adapted to deform a chip transversely to the direction of chip runoff, each of said hollows having the form of a notch extending along a longitudinal axis from a respective cutting edge into said middle region of said cutting tool and extending along said longitudinal axis towards said lower planar floor of said middle region, the first of each of said notches being located in the chip runoff area immediately outside a curved transitional region of each of said curved cutting corners and said cutting edges said individual notches positioned farther from each said curved cutting corner having increasingly larger spacings between one another when there are greater than two notches in number along a respective cutting edge, the longitudinal axis of an individual notch enclosing an angle ($\beta$) with respect to said cutting edge, said angle ($\beta$) increasing with respect to individual notches positioned farther from said curved cutting corner, each of said individual notches having two opposite sides of different vertical slope with respect to a horizontal plane, the side of a notch positioned nearer a curved cutting corner sloping at an angle ($\alpha_1$) with respect to said horizontal plane, the side of a notch positioned farther from said curved cutting corner sloping at an angle ($\alpha_2$) with respect to said horizontal plane, said ($\alpha_1$) being greater than ($\alpha_2$) for each notch.

8. A cutting tool according to claim 7 wherein each of said plurality of chip runoff areas is comprised of two hollows.

9. A cutting tool according to claim 7 wherein each of said plurality of chip runoff areas is comprised of three hollows.

10. A cutting tool according to claim 7 wherein the angle of slope or inclination ($\alpha_1$) is in a range of 45° to 70° and the angle of inclination or slope ($\alpha_2$) is in a range of 10° to 30°.

11. A cutting tool according to claim 7 wherein each of the plurality of chip runoff areas is comprised of two hollows having the form of notches and the first of the notches nearest each of the cutting corners encloses an angle ($\beta_1$), which is in a range of 40° to 60° with respect to the adjoining cutting edge.

12. A cutting tool according to claim 7 wherein each of the plurality of chip runoff areas is comprised of three hollows having the form of notches, the first of the notches nearest each of the cutting corners enclosing an angle ($\beta_1$), which is in a range of 40° to 60° with respect to its adjoining cutting edge and the second and third of the notches enclosing angles ($\beta_2$) and ($\beta_3$) which are in a range of 50° to 90° with respect to the adjoining cutting edge.

* * * * *